(12) United States Patent
Surace (10) Patent No.: US 10,309,226 B2
(45) Date of Patent: Jun. 4, 2019

(54) AIRFOIL HAVING PANELS

(71) Applicant: United Technologies Corporation, Farmington, CT (US)

(72) Inventor: Raymond Surace, Newington, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 317 days.

(21) Appl. No.: 15/353,874

(22) Filed: Nov. 17, 2016

(65) Prior Publication Data
US 2018/0135417 A1  May 17, 2018

(51) Int. Cl.
| F01D 5/28 | (2006.01) |
| F01D 5/14 | (2006.01) |
| F01D 9/04 | (2006.01) |
| F01D 25/12 | (2006.01) |
| F01D 5/18 | (2006.01) |
| F02C 7/12 | (2006.01) |

(52) U.S. Cl.
CPC .............. *F01D 5/147* (2013.01); *F01D 5/18* (2013.01); *F01D 5/188* (2013.01); *F01D 5/282* (2013.01); *F01D 5/284* (2013.01); *F01D 5/288* (2013.01); *F01D 9/041* (2013.01); *F01D 25/12* (2013.01); *F02C 7/12* (2013.01); *F05D 2220/32* (2013.01); *F05D 2230/60* (2013.01); *F05D 2230/90* (2013.01); *F05D 2240/12* (2013.01); *F05D 2240/30* (2013.01); *F05D 2260/202* (2013.01); *F05D 2300/20* (2013.01); *Y02T 50/672* (2013.01); *Y02T 50/676* (2013.01)

(58) Field of Classification Search
CPC . F01D 5/147; F01D 5/18; F01D 5/188; F01D 5/288
See application file for complete search history.

(56) References Cited

U.S. PATENT DOCUMENTS

| 3,215,511 A | 11/1965 | Chisholm |
| 4,137,008 A | 1/1979 | Grant et al. |
| 4,247,259 A | 1/1981 | Saboe et al. |
| 4,396,349 A | 8/1983 | Hueber |
| 4,786,234 A | 11/1988 | Readnour |
| 4,867,639 A * | 9/1989 | Strangman .............. F01D 11/12 415/173.4 |
| 4,914,794 A | 4/1990 | Strangman |

(Continued)

FOREIGN PATENT DOCUMENTS

| EP | 0764764 | 3/1997 |
| EP | 1764481 | 3/2007 |

(Continued)

OTHER PUBLICATIONS

European Search Report for European Patent Application No. 17202239.4 completed Mar. 12, 2018.

(Continued)

*Primary Examiner* — Richard A Edgar
*Assistant Examiner* — Michael L Sehn
(74) *Attorney, Agent, or Firm* — Carlson, Gaskey & Olds, P.C.

(57) ABSTRACT

An airfoil includes an airfoil section that defines an airfoil profile. The airfoil section includes a panel that forms a portion of the airfoil profile and a core structure to which the panel is secured.

22 Claims, 4 Drawing Sheets

(56) References Cited

U.S. PATENT DOCUMENTS

| | | | |
|---|---|---|---|
| 5,030,060 A * | 7/1991 | Liang | F01D 5/186 415/115 |
| 5,358,379 A | 10/1994 | Pepperman et al. | |
| 5,538,380 A | 7/1996 | Norton et al. | |
| 5,681,616 A | 10/1997 | Gupta et al. | |
| 5,705,231 A | 1/1998 | Nissley et al. | |
| 5,827,045 A * | 10/1998 | Beeck | F01D 5/284 416/96 A |
| 5,951,892 A | 9/1999 | Wolfla et al. | |
| 6,000,906 A | 12/1999 | Draskovich | |
| 6,102,656 A | 8/2000 | Nissley et al. | |
| 6,224,963 B1 | 5/2001 | Strangman | |
| 6,316,078 B1 | 11/2001 | Smialek | |
| 6,322,322 B1 | 11/2001 | Rhodes et al. | |
| 6,503,574 B1 | 1/2003 | Skelly et al. | |
| 6,514,046 B1 | 2/2003 | Morrison et al. | |
| 6,543,996 B2 | 4/2003 | Koschier | |
| 6,703,137 B2 | 3/2004 | Subramanian | |
| 6,709,230 B2 | 3/2004 | Morrison et al. | |
| 6,846,574 B2 | 1/2005 | Subramanian | |
| 7,104,756 B2 | 9/2006 | Harding et al. | |
| 7,316,539 B2 | 1/2008 | Campbell | |
| 7,326,030 B2 | 2/2008 | Albrecht et al. | |
| 7,435,058 B2 | 10/2008 | Campbell et al. | |
| 7,452,182 B2 | 11/2008 | Vance et al. | |
| 7,520,725 B1 | 4/2009 | Liang | |
| 7,670,116 B1 | 3/2010 | Wilson, Jr. et al. | |
| 7,686,570 B2 * | 3/2010 | Allen | C23C 26/00 415/173.4 |
| 7,963,745 B1 | 6/2011 | Liang | |
| 8,079,806 B2 | 12/2011 | Tholen et al. | |
| 8,182,208 B2 | 5/2012 | Bridges, Jr. et al. | |
| 8,197,211 B1 | 6/2012 | Liang | |
| 8,202,043 B2 | 6/2012 | McCaffrey | |
| 8,251,651 B2 | 8/2012 | Propheter-Hinckley et al. | |
| 8,366,392 B1 | 2/2013 | Laing | |
| 8,480,366 B2 | 7/2013 | Malecki et al. | |
| 8,506,243 B2 | 8/2013 | Strock et al. | |
| 8,821,124 B2 | 9/2014 | Viens et al. | |
| 2008/0159850 A1 | 7/2008 | Tholen et al. | |
| 2010/0074726 A1 | 3/2010 | Merrill et al. | |
| 2010/0136258 A1 | 6/2010 | Strock et al. | |
| 2011/0110771 A1 | 5/2011 | Morgan et al. | |
| 2016/0090851 A1 | 3/2016 | Carr et al. | |

FOREIGN PATENT DOCUMENTS

| | | |
|---|---|---|
| EP | 2105579 | 9/2009 |
| EP | 2696028 | 2/2014 |
| EP | 2853688 | 4/2015 |
| GB | 1487063 | 9/1977 |
| GB | 2272453 | 5/1994 |
| JP | 61066802 | 4/1986 |
| JP | 05321602 | 12/1993 |
| WO | 2015108592 | 7/2015 |

OTHER PUBLICATIONS

U.S. Appl. No. 13/429,474, filed Mar. 26, 2012.
U.S. Appl. No. 14/659,718, filed Mar. 17, 2015.
U.S. App. No. 14/812,668, filed Jul. 29, 2015.

* cited by examiner

AIRFOIL HAVING PANELS

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an airfoil section that defines an airfoil profile. The airfoil section has a panel that forms a portion of the airfoil profile, and a core structure to which the panel is secured.

In a further embodiment of any of the foregoing embodiments, the panel includes a first connector and the core structure includes a second connector that is interlocked with the first connector in a joint that secures the panel to the core structure.

In a further embodiment of any of the foregoing embodiments, one of the first connector and the second connector includes a dovetail and the other of the first connector and the second connector includes a doveslot.

In a further embodiment of any of the foregoing embodiments, the panel includes an internal passage.

In a further embodiment of any of the foregoing embodiments, the panel is ceramic and the core structure is metal.

In a further embodiment of any of the foregoing embodiments, the core structure includes an exterior wall that forms a portion of the airfoil profile.

In a further embodiment of any of the foregoing embodiments, the exterior wall forms a trailing end of the airfoil profile.

In a further embodiment of any of the foregoing embodiments, the panel includes an internal passage, an external wall that borders the internal passage, and a cooling hole that extends through the external wall and that opens to the internal passage.

The airfoil as recited in claim 1, further comprising an additional panel that forms a different portion of the airfoil profile and that is also secured to the core structure.

In a further embodiment of any of the foregoing embodiments, the panel and the additional panel have different compositions.

In a further embodiment of any of the foregoing embodiments, the panel is located adjacent the additional panel. The panel and the additional panel define a cooling hole at an edge interface there between.

In a further embodiment of any of the foregoing embodiments, the panel and the additional panel together form at least a portion of a leading end of the airfoil profile.

In a further embodiment of any of the foregoing embodiments, the core structure includes an internal passage.

In a further embodiment of any of the foregoing embodiments, at least one of the panel or the core structure includes a geometrically segmented coating section. The geometrically segmented coating section includes a wall that has an outer side. The outer side includes an array of cells, and a coating is disposed in the array of cells.

A gas turbine engine according to an example of the present disclosure includes a compressor section, a combustor in fluid communication with the compressor section, and a turbine section in fluid communication with the combustor. One of the turbine section or the compressor section has an airfoil that has an airfoil section that defines an airfoil profile. The airfoil section has a panel that forms a portion of the airfoil profile, and a core structure to which the panel is secured.

In a further embodiment of any of the foregoing embodiments, the panel includes a first connector and the core structure includes a second connector that is interlocked with the first connector in a joint that secures the panel to the core structure. One of the first connector and the second connector includes a dovetail and the other of the first connector and the second connector includes a doveslot, and the panel includes an internal passage.

In a further embodiment of any of the foregoing embodiments, the core structure includes an exterior wall that forms a portion of the airfoil profile. The panel is ceramic, and the core structure is metal.

A method of assembling an airfoil according to an example of the present disclosure includes securing a panel to a core structure to form an airfoil section. The airfoil section has an airfoil profile and the panel defines a portion of the airfoil profile.

In a further embodiment of any of the foregoing embodiments, the panel includes a first connector and the core structure includes a second connector, and the securing includes mating the first connector and the second connector together.

In a further embodiment of any of the foregoing embodiments, one of the first connector and the second connector includes a dovetail and the other of the first connector and the second connector includes a doveslot.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
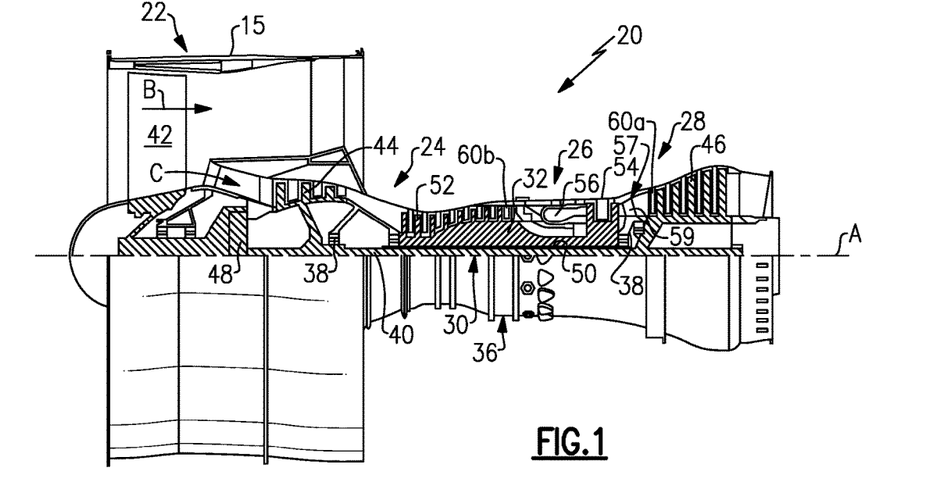
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 may be connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36, if included, is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans and gas turbines with multiple bypass streams.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

In gas turbine engines air is often bled from the compressor for cooling components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2A:
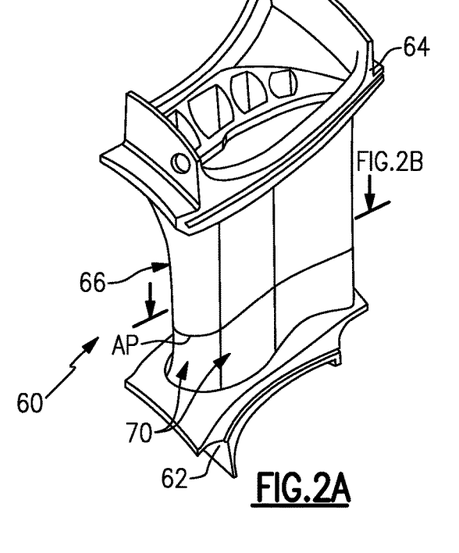
FIG. 2A illustrates an example airfoil in the gas turbine engine.

FIG. 2A illustrates one such component, namely an airfoil 60. For instance, the airfoil 60 can be a turbine vane, as represented at 60a in FIG. 1, or a compressor vane, as represented at 60b in FIG. 1. As will be appreciated, although the examples herein are described in the context of a vane, this disclosure is not limited to vanes, and the examples may also be applicable to blades or other airfoils that are exposed to high temperatures.

Figure 2B:
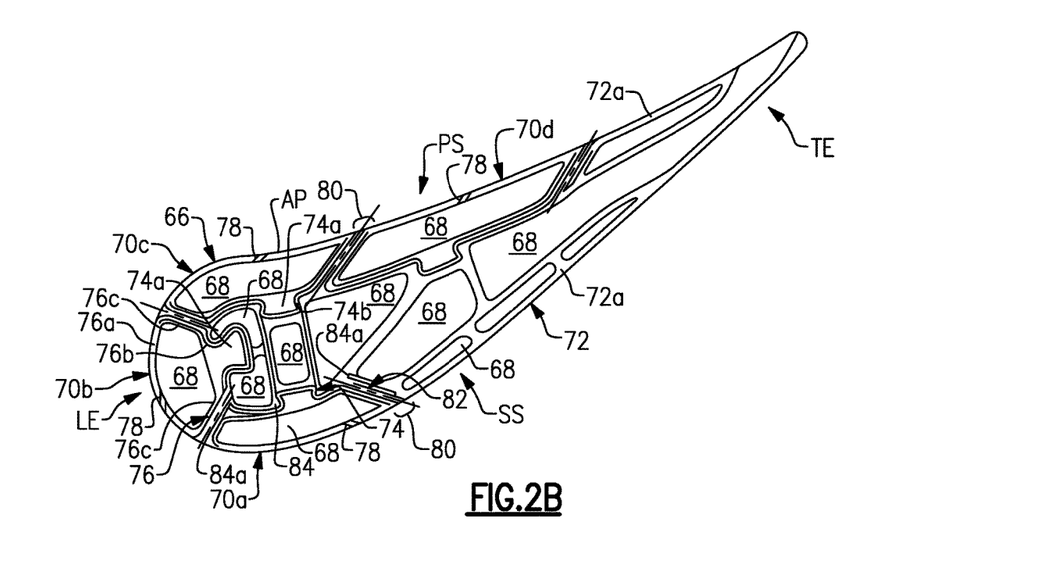
FIG. 2B illustrates a sectioned view of the airfoil of FIG. 1A.

The airfoil 60 includes inner and outer platforms 62/64 and an airfoil section 66 that extends radially between the inner and outer platforms 62/64. The airfoil section 66 may be hollow and can include one or more internal passages 68 (FIG. 2B). A passage can include a cavity, a channel, or the like.

The airfoil section 66 defines an airfoil profile, AP, which is the peripheral shape of the airfoil section 66 when viewed in a radial direction. For example, the airfoil profile has a wing-like shape that provides a reaction force via Bernoulli's principle with regard to flow over the airfoil section 66. The airfoil profile generally includes a leading end (LE), a trailing end (TE), a pressure side (PS), and a suction side (SS). For example, the leading end (LE) is the region of the airfoil profile (AP) that includes a leading edge of the airfoil profile (AP), and the trailing end (TE) is the region of the airfoil profile that includes a trailing edge. The leading edge may be the portion of the airfoil profile (AP) that first contacts air or the foremost edge of the airfoil profile (AP). The trailing edge may be the portion of the airfoil profile (AP) that last contacts air or the aftmost edge of the airfoil profile (AP). For a variable vane, the leading edge may shift, depending on the orientation of the vane.

The airfoil section 66 includes one or more distinct panels 70, which are also individually designated 70a, 70b, 70c, and 70d (collectively "panels 70"). Each of the panels 70 forms a portion of the airfoil profile. The panels 70 are each secured to a core structure 72, which positions and mechanically supports the panels 70. For instance, the panels 70 are removably secured to the core structure 72 such that any of individual panels 70a, 70b, 70c, and 70d can be removed and replaced if needed.

In the illustrated example, the airfoil section 66 includes four panels 70 secured to the core structure 72. As will be appreciated, fewer panels 70 or more panels 70 could be used in modified embodiments. Most typically, the core structure 72, provided as a single piece or single monolithic piece, supports multiple panels 70, such as at least one panel but typically not more than nine panels.

Each of the four panels 70 defines a different portion of the airfoil profile. For example, panel 70a defines a portion of the leading end LE (toward the suction side), panel 70b defines a central portion of the leading end LE, panel 70c defines a portion of the leading end LE (toward the pressure side), and panel 70d defines a portion of the pressure side PS. The leading end LE is therefore trifurcated. In particular, in a variable vane implementation in which the airfoil 60 can be pivoted, division of the leading end LE of the airfoil profile into two or more panels 70 enables the properties of leading end LE of the airfoil profile to be tailored to accommodate different incidence angles at different variable vane positions. The cooling air can be fed independently to the panels 70 at the pressure side of the leading end (LE), the leading edge of the leading end (LE), and the suction side of the leading end (LE) to ensure that no one panel 70 is starved of cooling air as the incidence angle experienced by the airfoil 60 varies, thus changing the location of the stagnation pressure region and the overall airfoil pressure distribution. In addition, if the panels 70 include film cooling holes, the cooling hole patterns in each panel can be tailored to cover the incidence angle range and ensure adequate film cooling coverage of the panel 70 and downstream portions of the panel.

There may be different environmental conditions at different locations of the airfoil profile. For instance, the suction side SS may have relatively severe temperature conditions on the airfoil profile. The leading end LE may have severe temperature and erosion conditions. In these regards, the panels 70a, 70b, 70c, and 70d may be individually adapted for the particular environmental conditions at the particular panel location on the airfoil profile.

In one example, the material of which each panel 70 is formed is selected to enhance the performance of the panel 70 for the particular panel location. For example, one or more of the panels 70 is ceramic, which has high temperature resistance and corrosion resistance in comparison to nickel alloys. A ceramic material is a compound of metallic or metalloid elements bonded with nonmetallic elements or metalloid elements primarily in ionic or covalent bonds. Example ceramic materials may include, but are not limited to, oxides, carbides, nitrides, borides, silicides, and combinations thereof. In further examples, one or more of the panels 70 are formed of a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof. The monolithic ceramic or CMC panels may be coated with an environmental barrier coating and/or a thermal barrier coating.

The core structure 72 may be formed of a ceramic or of a metal alloy. Metal alloys provide a good combination of strength and durability. Example alloys may include, but are not limited to, nickel alloys, cobalt alloys, a nickel alloy coated with cobalt or cobalt alloy, or non-nickel alloys that do not substantially react with ceramic.

The core structure 72 in the illustrated example generally includes several portions, defined by the different functions served. The forward portion of the core structure 72 serves to support and position the panels 70, while the aft portion serves to define a portion of the airfoil profile. In that regard, the aft portion of the core structure 72 may include exterior wall portions 72a that form a portion of the airfoil profile. In the illustrated example, the exterior wall portions 72a form the trailing end TE of the airfoil profile, which may have less severe environmental exposure conditions which the alloy of the core structure 72 can withstand. However, if enhanced thermal or environmental resistance is desired, panels 70 can instead be used to form the trailing end of the airfoil profile or the exterior wall portion 72a can be coated with a thermal and/or environmental barrier ceramic coating. As an example, the ceramic may include or may be oxides, carbides, nitrides, borides, silicides, or combinations thereof. In further examples, the ceramic may be or may include yttria stabilized with zirconia, hafnia, and/or gadolinia, gadolinia zirconate, molybdate, alumina, or combinations thereof.

Each of the panels 70 is secured to the core structure 72 in a respective joint 74. For instance, the joints 74 are interlocking joints. In this regard, each panel 70 includes a first connector 74a and the core structure 72 includes a plurality of second connectors 74b. Each second connector 74b on the core structure 72 interlocks with a corresponding one of the first connectors 74a on the panels 70 to secure the panels 70 and the core structure 72 together in a "jigsaw puzzle" arrangement. The core structure 72 has a shape that geometrically compliments the geometry of the panels 70 such that, when assembled together, the panels 70 and core structure 72 form the airfoil profile. Most typically, the panels 70 and core structure 72 will form the complete airfoil profile.

Figure 3:
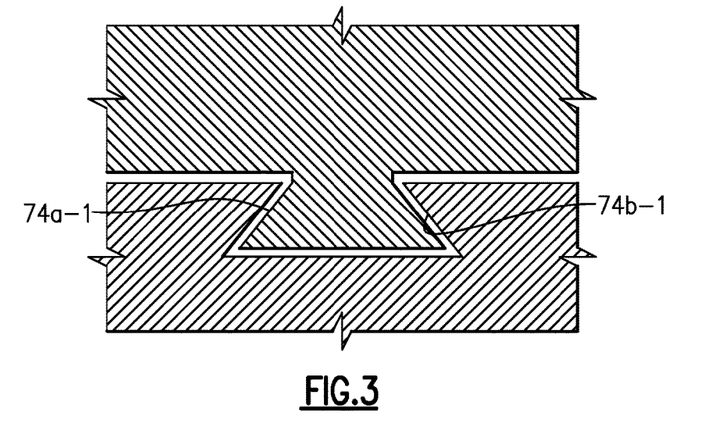
FIG. 3 illustrates an example interlocked joint between a panel and a core structure.

The type of interlocking joint may be, but is not limited to, a dovetail type joint. For instance, as shown in FIG. 3, one of the first connector 74a or the second connector 74b includes a dovetail 74a-1 and the other of the first connector 74a or the second connector 74b includes a doveslot 74b-1. Dovetails generally are tapered tabs and doveslots are generally tapered slots that correspond in geometry to the tapered tab such that the tab and slot interlock. In the example in FIG. 2B, the panels 70 each include dovetails and the core structure 72 includes doveslots. Of course, in modified embodiments, the dovetails may be on the core structure 72 and the doveslots may be on the panels 70; or the panels 70 and core structure 72 may include a mix of dovetails and doveslots.

In the illustrated examples, each of the panels 70 is hollow and defines one of the internal passages 68. The passages 68 permit cooling bleed air to be provided into or through the panels 70. Alternatively, the passages 68 may be sealed to provide an insulation volume. Referring to the individual panel 70b (FIG. 2B) as a representative example of all of the panels 70, the panel 70b includes a panel wall 76 that circumscribes the passage 68. The panel wall 76 includes an exterior wall or wall portion 76a that is exposed in the core gas path, a panel interior wall or wall portion 76b, and panel sidewalls or wall portions 76c that join the exterior wall 76a and the interior wall 76b. In this example, the interior wall 76b defines the first connector 74a.

The panel wall 76 may also include features to facilitate thermal management. For instance, the exterior wall 76a may include one or more cooling holes 78 to provide a film of cooling bleed air over the outside surface of the exterior wall 76a. As will be appreciated given this disclosure, the locations, sizes, and numbers of cooling holes 78 may be varied depending on cooling requirements.

The panels 70 are generally arranged adjacent to one another. In the example of FIG. 2B, the panel 70a is adjacent the panel 70b, the panel 70b is also adjacent the panel 70c, and the panel 70c is also adjacent the panel 70d. Adjacent ones of the panels 70 may or may not contact each other at edge interfaces 80. For instance, there may be full contact, partial contact, or no contact between adjacent panels 70 in a particular interface 80. Where there is partial contact or no contact, adjacent panels 70 may define a cooling hole 82 at the edge interface 80. A film of cooling bleed air may be emitted from the cooling hole 82 over the outside surface of the panels 70. As will be appreciated given this disclosure, the locations, sizes, and numbers of cooling holes 82 may be varied depending on cooling requirements.

Cooling bleed air may be provided from the core structure 72. In this regard, the core structure 72 may include a core wall 84 that circumscribes the passages 68. The core wall 84 may also have one or more core cooling holes 84a for emitting the cooling bleed air to the panels 70. The core cooling holes 84a may be aligned with the cooling holes 82 and, in essence, serve as continuations of the cooling holes 82. Additionally or alternatively, one or more of the core cooling holes 84a may be non-aligned with the cooling holes 82, to provide impingement cooling onto the interior wall 76b of one of the panels 70. In another scenario, additionally or alternatively, one or more of the cooling holes 84a may be non-aligned with the cooling holes 82, to provide a source of air inside the panels 70 to feed film cooling holes 78.

The cooling bleed air provided from the core structure 72 may also facilitate securing and positioning of the panels 70. For instance, the pressure of the cooling bleed air that flows from the core structure 72 against the panels 70 may urge the panels 70 outwards from the core structure 72. The outward urging of the panels 70 causes the panels 70 to move to a position in which the first connector 74a bears against the second connector 74b, or vice versa depending on the type of joint. Thus, the cooling bleed air provides a positive pressure positioning of the panels 70, and friction in the joints 74 may also serve to resist movement of the panels from that position.

Figure 4:
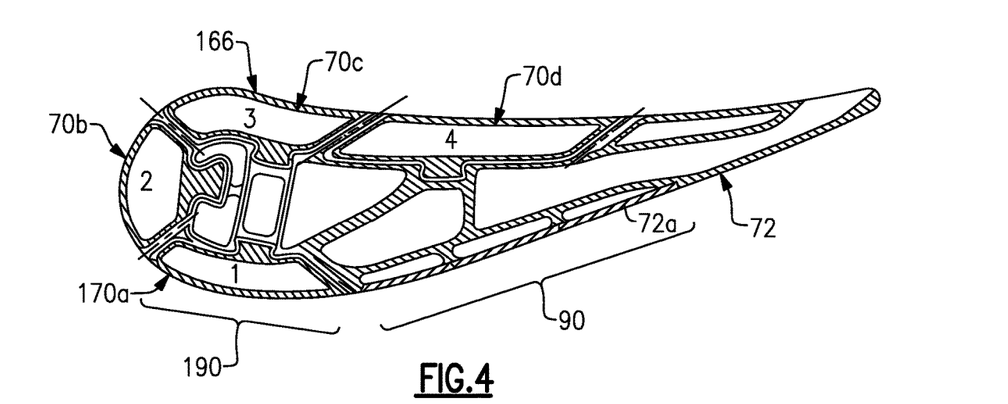
FIG. 4 illustrates a sectioned view of another example airfoil that has a geometrically segmented coating.

As described above, there may be instances in which the exterior wall portions 72a that form a portion of the airfoil profile require greater thermal or environmental resistance. Similarly, there may also be instances in which one or more of the panels 70 requires greater thermal or environmental resistance. Generally, greater thermal or environmental resistance reduces the need for cooling bleed air. In this regard, FIG. 4 illustrates another example of an airfoil section 166. In this disclosure, like reference numerals designate like elements where appropriate and reference numerals with the addition of one-hundred or multiples thereof designate modified elements that are understood to incorporate the same features and benefits of the corresponding elements. In this example, the exterior wall portion 72a includes a geometric segmented coating section 190. Likewise, one or more of the panels 70 may additionally or alternatively include a geometric segmented coating section 190. Here, the panel 70a is shown with the coating section 190, although panels 70b, 70c, and/or 70d may also include a coating section 190.

Figure 5:
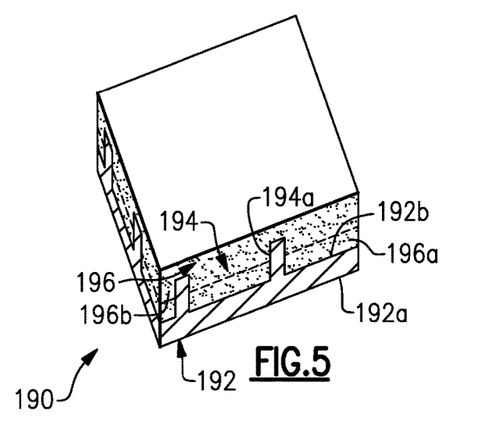
FIG. 5 illustrates a sectioned perspective view of a representative portion of a geometrically segmented coating.
Figure 6:
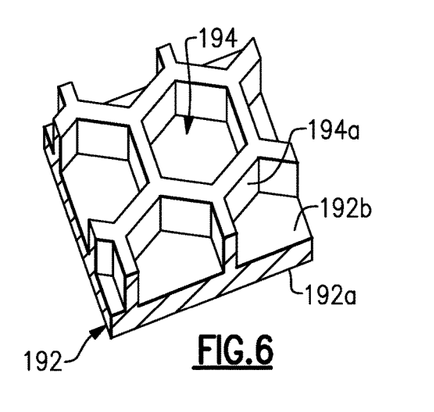
FIG. 6 illustrates a wall of the segmented coating, without the coating.

A representative portion of the coating section 190 is shown in a cutaway view in FIG. 5. The coating section 190 includes a wall 192. The wall 192 includes a first or inner side 192a and a second or exterior side 192b that is opposite the first side 192a. The second side 192b includes an array of cells 194 defined by cell sidewalls 194a. The array is a repeating geometric pattern of one or more cell geometries. In this example, the cell sidewalls 194a have a uniform thickness. As shown in the isolated view of the wall 192 in FIG. 6, the cells 194 are hexagonal. Alternatively, the cells 194 may be circular, ovular, other polygonal geometry, or mixed cell geometries. The cells 194 may be machined or cast directly into the wall 192 (as a substrate), or machined into a metallic bond coating applied to the wall exterior side 192b. In the case where the cells 194 are machined or cast directly into the wall 192 (as a substrate), a metallic bond coating is applied.

A ceramic based thermal barrier coating 196 (FIG. 5) is disposed in the array of cells 194. The cells 194 mechanically segment the coating. This segmentation induces stress relief cracks in the ceramic coating making it tolerant to sintering. The cells 194 thus provide good spallation resistance of the coating 196, particularly at higher temperature locations. In turn, greater spallation resistance may reduce the need for bleed air for cooling or enable use of higher temperature bleed air that is less of an efficiency penalty. The coating 196 may be a barrier coating, such as a thermal barrier or environmental barrier, which is formed of a ceramic material. The coating 196 may be a monolayer coating but more typically will be a multi-layer coating. For instance, the coating 196 has a first coating layer 196a and a second coating layer 196b. In this example, the second coating layer 196b is a topcoat.

The ceramic material of the coating 196 provides thermal and/or environmental resistance. As an example, the ceramic material may include or may be yttria stabilized with zirconia, hafnia, and/or gadolinia, gadolinia zirconate, molybdate, alumina, or combinations thereof.

The bond coat for attaching the ceramic material to the wall 192 may be formed of an alloy. Example alloys may include, but are not limited to, nickel alloys, cobalt alloys, a nickel alloy coated with cobalt or cobalt alloy, or a nonnickel alloys that do not substantially react with ceramic. The bond coat may include a nickel alloy, platinum, gold, silver, or MCrAlY, where the M includes at least one of nickel, cobalt, iron, or combinations thereof.

The cell sidewalls 194a facilitate reducing internal stresses in the coating 196 that may occur from sintering at relatively high surface temperatures during use in the engine 20. The sintering may result in partial melting, densification, and diffusional shrinkage of the coating 196 and thereby induce internal stresses. The cell sidewalls 194a serve to produce faults in the coating 196. The faults provide locations for releasing energy associated with the internal stresses (e.g., reducing shear and radial stresses). That is, the energy associated with the internal stresses may be dissipated in the faults such that there is less energy available for causing delamination cracking between the coating 196 and the underlying wall 192.

The coating section 190 may be formed using several different fabrication techniques. As an example, the wall 192 may be fabricated by investment casting, additive manufacturing, brazing, or combinations thereof, but is not limited to such techniques. For instance, the cells 194 can be separately fabricated and brazed to the remaining portion of the wall 192, which can be investment cast or additively fabricated. Alternatively, the cells 194 can be formed by other techniques, such as depositing an alloy bond coating and removing sections of the alloy coating by machining, electro-discharge machining (EDM), or other removal process. In another scenario the cells 194 can be machined into the wall 192 (as a substrate).

To produce the coating 196, ceramic coating material is deposited into the cells 194. The deposition process can include, but is not limited to, plasma spray or physical vapor deposition. In one example, plasma spray is used to produce a more durable version of the coating 196. For instance, the coating 196 has a laminar microstructure. The laminar microstructure includes grains of ceramic material that have a high aspect ratio. The laminar microstructure is a product of the plasma spray process, in which droplets of melted or partially melted ceramic material are sprayed onto the cells 194. Upon impact, the droplets flatten and solidify, yielding the laminar microstructure. There may be voids or pores among the grains; however, the coating 196 is substantially fully dense. For instance, the coating 196 has a porosity of less than 15%.

The ceramic coating material fills or substantially fills the cells 194 and is deposited in a thickness that may be equal to or greater than the height of the cell sidewalls 194a. At this stage, the surface of the coating may have contours from the underlying cells 194. If such contours are undesired, the surface may be machined, ground, or abraded flat. For instance, the surface is reduced down to or close to the tops of the cell sidewalls 194a.

Figure 7:
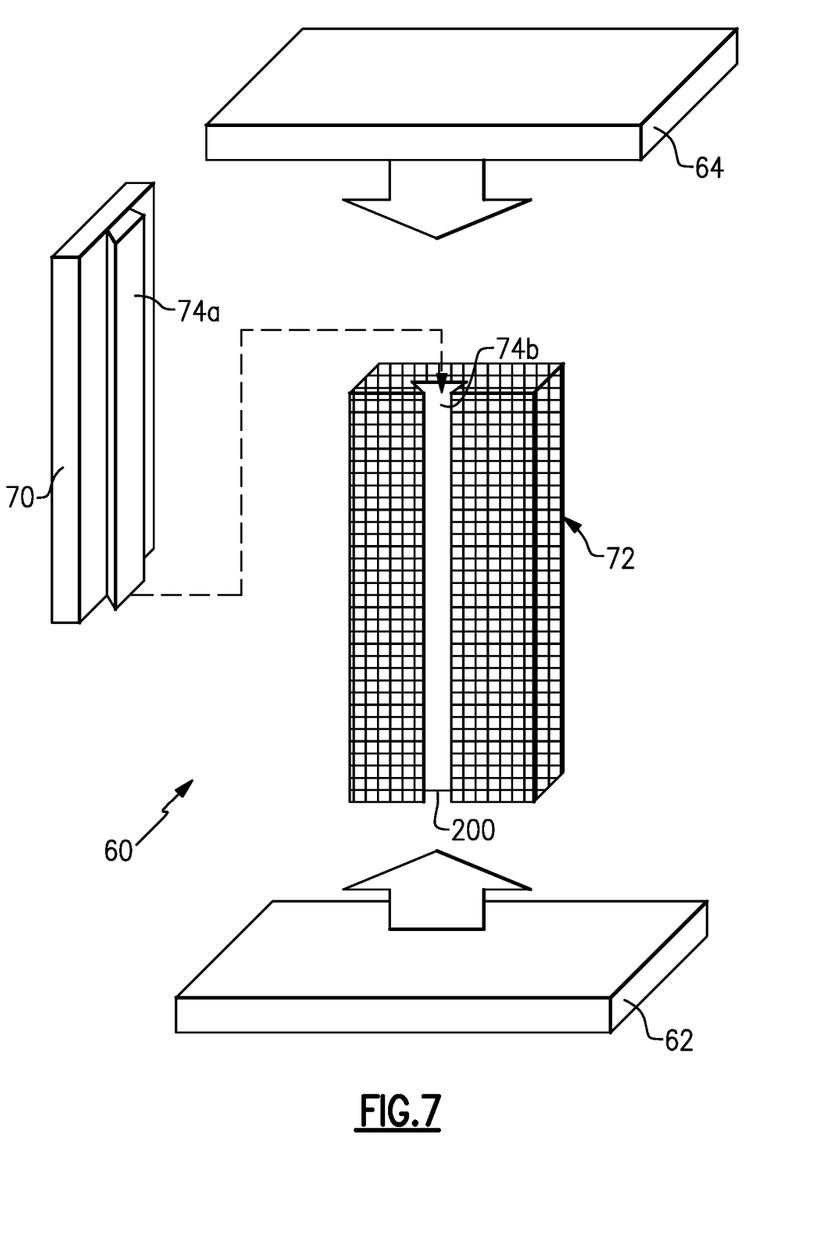
FIG. 7 illustrates an exploded view of an example airfoil having panels and a core structure.

FIG. 7 illustrates an exploded view of selected components of the airfoil 60, with the components schematically represented. To assemble the airfoil 60, the panel 70 is secured to the core structure 72 by engaging the first connector 74a on the panel 70 with the second connector 74b on the core structure 72. For a dovetail type joint, the first connector 74a is slid into engagement with the second connector 74b. For instance, the dovetail 74a-1 is slidingly inserted into the doveslot 74b-1 (FIG. 3). A stop 200 may be provided on the core structure 72, the panel 70, or both. The stop 200 serves to prevent further insertion and to properly seat the panel 70. Additional panels 70 may be secured to the core structure 72 in a similar manner. The panels 70 and core structure 72 are then trapped between the platforms 62/64 to form the airfoil 60. In this regard, should the panels 70 or core structure 72 require replacement, the airfoil 60 can be disassembled, the core structure 72 and/or one or more panels 70 can be replaced with new ones, and the airfoil 60 can be reassembled. Accordingly, the core panels 70 and core structure 72 can be produced individually as new parts for an original airfoil or as replacement parts in an existing airfoil.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
    an airfoil section defining an airfoil profile, the airfoil section including
        a panel that forms a portion of the airfoil profile, the panel including a geometrically segmented coating section, the geometrically segmented coating section including a wall that has an outer side, the outer side including an array of closed-sided cells defined by cell sidewalls, and a coating disposed in the array of closed-sided cells, and
        a core structure to which the panel is secured.

2. The airfoil as recited in claim 1, wherein the panel includes a first connector and the core structure includes a second connector that is interlocked with the first connector in a joint that secures the panel to the core structure.

3. The airfoil as recited in claim 2, wherein one of the first connector and the second connector includes a dovetail and the other of the first connector and the second connector includes a doveslot.

4. The airfoil as recited in claim 1, wherein the panel includes an internal passage.

5. The airfoil as recited in claim 1, wherein the panel is ceramic and the core structure is metal.

6. The airfoil as recited in claim 5, wherein the core structure includes an exterior wall that forms a portion of the airfoil profile.

7. The airfoil as recited in claim 6, wherein the exterior wall forms a trailing end of the airfoil profile.

8. The airfoil as recited in claim 1, wherein the panel includes an internal passage, an external wall that borders the internal passage, and a cooling hole that extends through the external wall and that opens to the internal passage.

9. The airfoil as recited in claim 1, further comprising an additional panel that forms a different portion of the airfoil profile and that is also secured to the core structure.

10. The airfoil as recited in claim 9, wherein the panel and the additional panel have different compositions.

11. The airfoil as recited in claim 9, wherein the panel is located adjacent the additional panel, the panel and the additional panel defining a cooling hole at an edge interface there between.

12. The airfoil as recited in claim 9, wherein the panel and the additional panel together form at least a portion of a leading end of the airfoil profile.

13. The airfoil as recited in claim 1, wherein the core structure includes an internal passage.

14. The airfoil as recited in claim 1, wherein the coating is a ceramic material selected from the group consisting of zirconia, hafnia, gatolinia, gatolinia zirconate, molybdate, alumina, and combinations thereof.

15. The airfoil as recited in claim 14, wherein the closed-sided cell are closed-sided cells.

16. The airfoil as recited in claim 14, further comprising an additional panel that forms a different portion of the airfoil profile and that is also secured to the core structure, and the additional panel is formed of a monolithic ceramic or a ceramic matrix composite.

17. A gas turbine engine comprising:
a compressor section;
a combustor in fluid communication with the compressor section; and
a turbine section in fluid communication with the combustor,
at least one of the turbine section or the compressor section including an airfoil having an airfoil section defining an airfoil profile, the airfoil section including a panel that forms a portion of the airfoil profile, the panel including a geometrically segmented coating section, the geometrically segmented coating section including a wall that has an outer side, the outer side including an array of polygonal cells defined by cell sidewalls, and a coating disposed in the array of polygonal cells, and
a core structure to which the panel is secured.

18. The gas turbine engine as recited in claim 17, wherein the panel includes a first connector and the core structure includes a second connector that is interlocked with the first connector in a joint that secures the panel to the core structure, one of the first connector and the second connector includes a dovetail and the other of the first connector and the second connector includes a doveslot, and the panel includes an internal passage.

19. The airfoil as recited in claim 18, wherein the core structure includes an exterior wall that forms a portion of the airfoil profile, the panel is ceramic, and the core structure is metal.

20. A method of assembling an airfoil, the method comprising:
securing a panel to a core structure to form an airfoil section, wherein the airfoil section has an airfoil profile and the panel defines a portion of the airfoil profile, the panel including a geometrically segmented coating section, the geometrically segmented coating section including a wall that has an outer side, the outer side including an array of closed-sided cells defined by cell sidewalls, and a coating disposed in the array of closed-sided cells.

21. The method as recited in claim 20, wherein the panel includes a first connector and the core structure includes a second connector, and the securing includes mating the first connector and the second connector together.

22. The method as recited in claim 21, wherein one of the first connector and the second connector includes a dovetail and the other of the first connector and the second connector includes a doveslot.

* * * * *